United States Patent [19]

Delorme

[11] Patent Number: 5,115,540
[45] Date of Patent: May 26, 1992

[54] SPRING-LOADED HINGE

[75] Inventor: Serge Delorme, Paroches, France

[73] Assignee: Essilor International Compagnie, Creteil, France

[21] Appl. No.: 616,201

[22] Filed: Nov. 20, 1990

[30] Foreign Application Priority Data

Nov. 21, 1989 [FR] France ................ 89 15230

[51] Int. Cl.⁵ ............................................. G02C 5/22
[52] U.S. Cl. ................................... 16/228; 351/153
[58] Field of Search ............ 16/228, 224; 351/121, 351/113, 153

[56] References Cited

U.S. PATENT DOCUMENTS

| 1,504,212 | 8/1924 | Carlson | 351/153 |
| 3,644,023 | 2/1972 | Villani | |
| 3,957,360 | 5/1976 | Villani | |
| 4,351,086 | 9/1982 | Drlik | |

FOREIGN PATENT DOCUMENTS

| 0003928 | 9/1979 | European Pat. Off. | |
| 714839 | 11/1931 | France | 351/153 |
| 2028893 | 10/1970 | France | |
| 2246883 | 5/1975 | France | |
| 2466788 | 4/1981 | France | |
| 2535070 | 4/1984 | France | |
| 2609816 | 7/1988 | France | |

Primary Examiner—Robert L. Spruill
Assistant Examiner—Carmine Cuda
Attorney, Agent, or Firm—Longacre & White

[57] ABSTRACT

A spring-loaded hinge suitable for eyeglass frames comprises two hollow members with respective bores and comprising at respective ends complementary articulation surfaces. The two bores open at facing orifices and a connecting part accommodated in the two bores passes through these orifices. An enlarged end of the connecting part is abutted against an inside end surface of one of the bores and its other end is coupled to a spring accommodated in the other bore. The spring is prestressed to urge the articulation surfaces against each other through the intermediary of the connecting part.

14 Claims, 2 Drawing Sheets

SPRING-LOADED HINGE

BACKGROUND OF THE INVENTION

1. Field of the Invention

The invention concerns a spring-loaded hinge, in particular a spring-loaded hinge for eyeglass frames; it primarily concerns a new arrangement requiring no pivot screw.

2. Description of the Prior Art

In known eyeglass frames each hinge incorporates a pivot screw which assembles together the male and female hinge members and is the material embodiment of the pivot axis of the hinge. Unknown to the eyeglass wearer, the screw may loosen and eventually drop out, with the result that the hinge falls apart and the corresponding temple of the eyeglass frame is detached.

The invention proposes a new type hinge in which the two members articulated to each other are held together without any pivot screw by spring-loaded means providing better resistance to excessive lateral forces without risk of a temple or the hinge breaking.

SUMMARY OF THE INVENTION

The present invention consists in an spring-loaded hinge suitable for eyeglass frames comprising two hollow members with respective recesses and comprising at respective ends complementary articulation surfaces, the two recesses opening at facing orifices, a connecting part accommodated in the two recesses, passing through said orifices, having an enlarged end abutted against an inside end surface of one of said recesses and having its other end coupled to a spring accommodated in the other recess, said spring being prestressed to urge said articulation surfaces against each other through the intermediary of said connecting part.

In a preferred embodiment of the invention the spring is a coil spring mounted on said connecting part which is essentially rod-shape.

The invention will be better understood and other advantages of the invention will emerge more clearly from the following description of various embodiments of hinge in accordance with the invention given by way of non-limiting example only with reference to the appended diagrammatic drawings.

DESCRIPTION OF THE PREFERRED EMBODIMENTS

Figure 1:
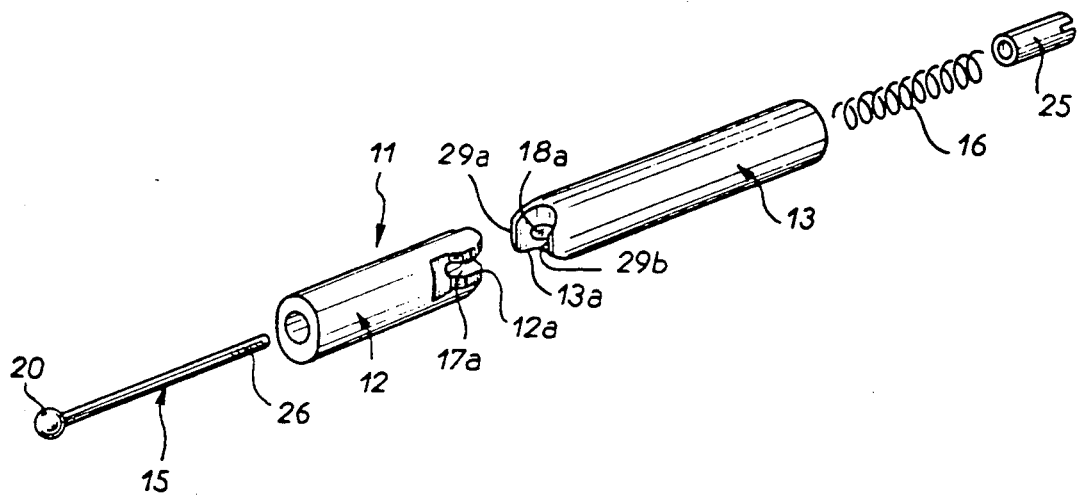
FIG. 1 is an exploded perspective view of a hinge in accordance with the invention.
Figure 2:
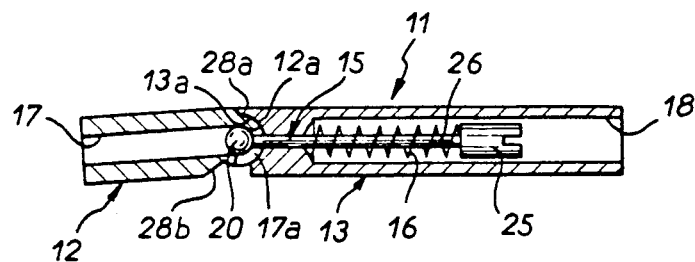
FIG. 2 shows the same hinge with its component parts assembled together, in cross-section perpendicular to the pivot axis.

Referring to FIGS. 1 and 2, a spring-loaded hinge 11 for an eyeglass frame essentially comprises two hollow members 12, 13 with substantially cylindrical articulation surfaces 12, 13a at respective ends, a connecting part 15 and a spring 16. The two hollow members 12, 13 incorporate respective longitudinal recesses 17, 18. The articulation surface 12a at the end of the member 12 is convex. The articulation surface 13a at the end of the member 13 is concave. These two surfaces bear on each other and have substantially the same radius of curvature so that they have a common pivot axis (not shown).

The member 12 is preferably a tenon on the front part of the eyeglass frame (not shown) and the member 13 is preferably part of a temple of the frame. The two recesses 17, 18 open onto the respective articulation surfaces 12a, 13a at respective orifices 17a, 18a. The connecting part 15 is accommodated in both the recesses and therefore passes through the two aligned orifices 17a, 18a .

The connecting part is essentially rod-shaped with an enlarged end 20 which abuts against the end surface of the recess 17 in the member 12. Its enlarged end 20 is substantially spherical and the inside end surface of the recess 17 has a complementary substantially spherical shape to enable articulation of the connecting part 15 relative to the member 12. To this end the orifice 17a in the member 12 is extended laterally to form a slot facing towards the interior of the hinge. The other end of the connecting part 15, engaged in the recess 18, is coupled to the spring 16 accommodated in the same recess. The spring 16 is pre-stressed so that through the connecting part 15 it urges the two articulation surfaces 12a, 13a against each other.

The spring 16 is a coil spring fitted onto the rod forming the connecting part and is compressed between the end surface of the recess 18 (near the orifice 18a) in which it is accommodated and an abutment 25 attached to the rod. The abutment 25 is in the form of a nut screwed onto a screwthreaded end portion 26 of the rod. This enables the initial pre-stressing of the spring to be varied.

The articulation surfaces of the two members are extended laterally by analogous shoulders or abutment surfaces cooperating two-by-two to define the normal angle of pivoting of one member relative to the other. To be more precise, the member 12 has, on the outside of the hinge axis, a straight shoulder 28a against which bears an external lateral edge 29a of the articulation surface 13a constituting an abutment surface. Likewise, the member 12 has, on the inside of the hinge axis, an inclined shoulder 28b against which bears an internal lateral edge 29b of the same surface 13a. The normal angle of pivoting between the two members 12 and 13 is clearly defined by the respective positions of said shoulders and lateral edges. If a force is applied which tends to accentuate this pivoting, in particular towards the outside, additional compression of the spring 16 and cooperation of the abutment surfaces prevent the hinge from breaking.

The operation of the hinge is obvious from the above description. Within the limits of normal pivoting the two surfaces 12a, 13a slide against each other, being held in contact by the initial compression force of the spring, set by the position of the nut 25. Located inside the recess 18, the nut is not subject to any action tending to unscrew it or screw it in further. The compression force applied by the spring 16 does not vary and there is no risk of the hinge members separating.

As mentioned previously, further pivoting of the temple at the hinge is of no consequence as it causes further compression of the spring. All risk of breakage is eliminated by the fact that there is no physical pivot member (like the pivot screw in a conventional hinge).

Figure 3:
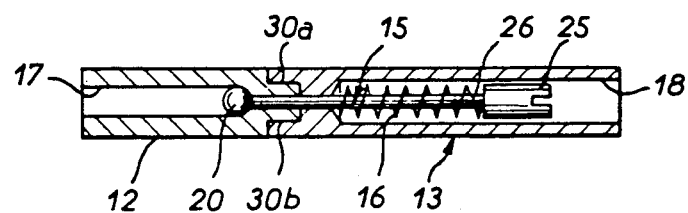
FIG. 3 shows an alternative embodiment of the hinge with its component parts assembled together, in cross-section parallel to the pivot axis.
Figure 4:
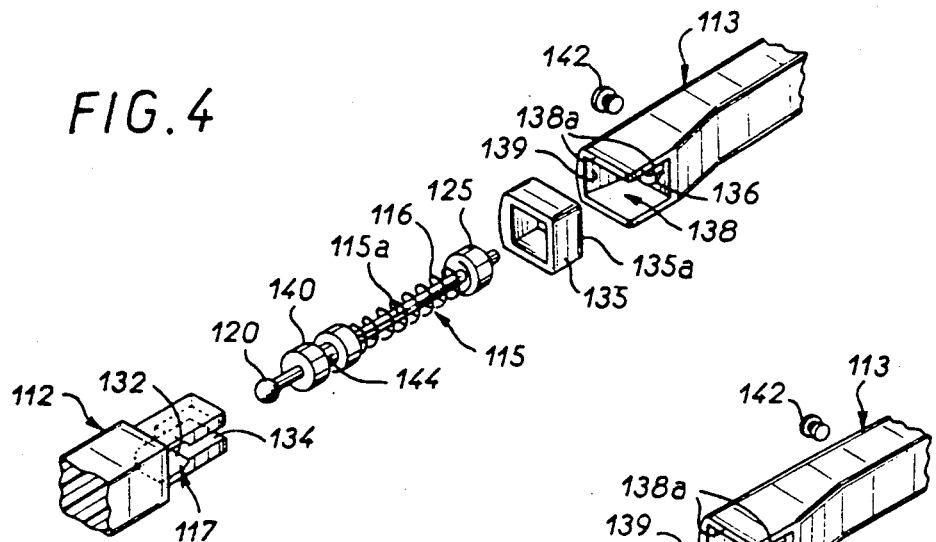
FIG. 4 is an exploded perspective view of another embodiment of the hinge.

In the example described above, the sliding of the members 12 and 13 along the axis of the hinge is prevented only by the presence of the connecting part 15 extending between these two members. The FIG. 3 embodiment avoids the application of any axial force to the connecting part. In this embodiment, in which similar structural parts carry the same reference numbers, the articulation surfaces are shaped to have at least one shoulder extending transversely relative to the common axis of their cylindrical parts in contact, to prevent the two members sliding relative to each other along this axis.

Two shoulders 30a, 30b are provided, on opposite sides of the connecting part 15. In other words, to each side of the connecting part 15 there are concave and convex cylindrical surfaces on each member 12, 13 to define interleaved hinged members between which there is no physical pivot member.

In the embodiment of FIGS. 4 through 7, in which similar parts carry the same reference number increased by 100, the spring-loaded hinge in accordance with the invention comprises as previously two hollow members 112, 113, a connecting part 115, a spring 116 and an abutment 125 in the form of a nut screwed onto a screwthreaded end portion of the rod 115a of the connecting part 115. The latter has a substantially spherical enlarged end 120. All the parts just described have substantially the same function as in the previous embodiment.

The hollow members 112 and 113 are square or rectangular in transverse cross-section. The recess 117 in the member 112 comprises a cavity 132 shaped and sized to accommodate the enlarged end 120 and to enable it to move. It is extended by a slot 134 shaped and sized to accommodate part of the rod 115a and to enable it to move laterally. The two parts 132, 134 are open laterally (FIG. 4) to enable insertion of the connecting part 115 and in particular the fitting of the enlarged end 120 into the cavity 132 of the recess 117.

A locking member 135 in the form of a square or rectangular cross-section ring is mounted at the end of the hollow member 112 to hold the enlarged end 120 of the connecting member in the cavity 132. To this end, the end portion of the member 112 has a smaller cross-section defining a shoulder against which the locking member 135 bears. After assembly, the locking member 135 forms an integral part of the hollow member 112. The other hollow member 113 has at its end a wide cavity 138 open towards the front and laterally towards the interior of the hinge and a cylindrical recess 136 opening into the bottom of the cavity 138 and adapted to accommodate the spring 116 and the major part of the connecting member 115. The cavity 138 is shaped and sized to accommodate the end of the member 112 which projects beyond the locking member 135 when the latter is installed.

In this embodiment the member 112 is completed by the locking member 135 and the above-defined articulation surfaces are the square or rectangular edge 135a of the locking member and the edge 138a of the opening of the cavity 138. Because the cavity 138 is open at the end and laterally, the edge 138a forming the articulation surface lies in two substantially perpendicular planes. The side wall of the cavity 138 opposite the opening incorporates a facet 139 at a particular angle to the axis of the cylindrical recess 136 to enable some further movement of the member 113 towards the exterior of the hinge, in other words beyond the stable position in which the members 112 and 113 are substantially in alignment. This additional movement is visible in FIG. 7.

An abutment member 140 slides on the rod 115a of the connecting part 115. It is urged towards the enlarged part 120 by the spring 116. Fixing means 142 is provided between the hollow member 113 and the abutment member 140 to fasten them together. To be more precise, the abutment member 140 is bobbin-shape with an annular groove 144 and the fixing member 142 is inserted through a hole 146 in the hollow member 113 so as to project into its interior, being housed in the annular groove 144 when fitted. The fixing member 142 is a pin. It comprises a head 148, an end portion 149 whose diameter is substantially equal to the length of the groove 144, and a reduced diameter portion 150 between the head 148 and the end portion 149. When fitted, the reduced diameter portion 150 is engaged in the hole 146 in the member 113, which is of greater diameter so that the action of the spring 116 on the abutment member 140 locks the fixing member 142.

Figure 5:
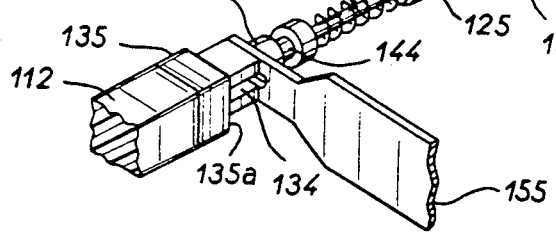
FIG. 5 is a view analogous to FIG. 3 showing the assembly of the component parts of the hinge using a special tool.
Figure 6A:
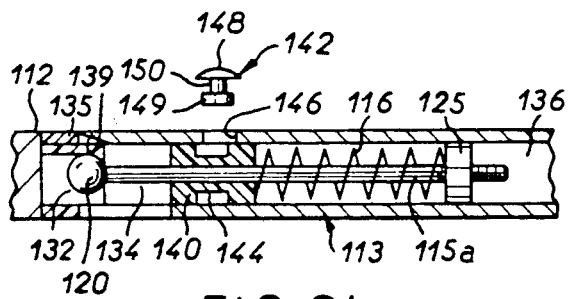
FIGS. 6a through are partial views of the same hinge in cross-section showing the assembly process.
Figure 6B:
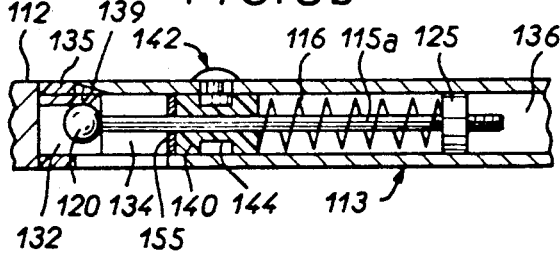
Figure 6C:
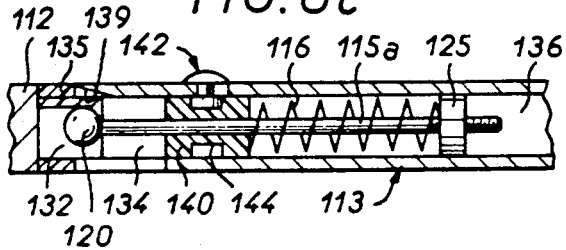

FIGS. 5 and 6 show the assembly steps. They require the use of a tool 155 forming a shim and incorporating a slot 156 which can be fitted over the rod 115a. To start with the larger end 120 of the connecting member 115 is inserted in the cavity 132 in the member 112. The locking member 135 is then fitted and the end of the tool 155 is inserted between the end of the member 112 and the abutment member 140. This situation is shown in FIG. 5. The thickness of the tool 155 is such that when the connecting member and the spring are engaged in the cylindrical recess 136 the groove 144 is aligned with the hole 146 in the member 113. All that then remains is to fit the fixing member 142. This situation is shown in FIG. 6b. Removal of the tool 155 enables slight movement of the abutment member 140 due to the action of the spring 116, which moves the fixing member 142 and locks it into the position shown in FIG. 6c.

Figure 7:
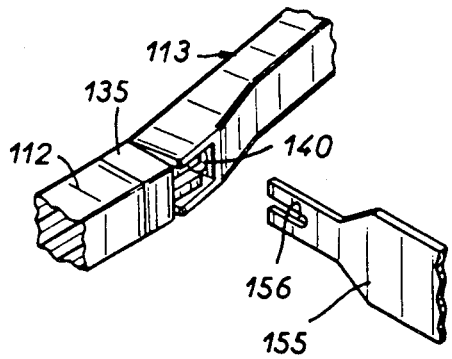
FIG. 7 shows the same hinge with its component parts assembled together at the beginning of dismantling.

This completes the assembly of the hinge. As the edge 138a of the cavity 138 incorporates two approximately perpendicular areas (FIG. 4), there are two stable positions of the member 113 relative to the member 112, constituting the two normal use positions of the spring-loaded hinge. However, as previously mentioned, additional pivoting of the member 113 towards the outside is possible because of the particular shape of the cavity 138. This additional pivoting is used to dismantle the hinge, if required, and as shown in FIG. 7. In this case, the member 113 is forced outwards, enabling the tool 155 to be reinserted between the end of the member 112 and the abutment member 140. The hinge members then resume the position shown in FIG. 6b, enabling the fixing member 142 to be extracted, after which all the component parts of the hinge can be dismantled.

There is claimed:

1. A spring loaded hinge suitable for eyeglass frames comprising two elongate hollow members with respective longitudinal recesses and comprising at respective ends complementary articulation surfaces in contact with each other, the two recesses opening at facing orifices, a connecting part accommodated in the two recesses, passing through said orifices, having an enlarged end abutted against an inside end surface of one of said recesses and having its other end coupled to a spring accommodated in the other recess, said spring being prestressed to urge said articulation surfaces against each other through the intermediary of said connecting part and said one of said recesses being provided with an orifice to introduce said enlarged end and a longitudinal cavity to retain said enlarged end.

2. Spring-loaded hinge according to claim 1 wherein said articulation surfaces are at least in part substantially cylindrical, one being convex and the other concave, and said recesses open onto said articulation surfaces.

3. Spring-loaded hinge according to claim 2 wherein said connecting part is a rod and said spring is a coil spring mounted on said rod and compressed between an end surface of the recess in which it is accommodated and an abutment member fastened to said rod.

4. Spring-loaded hinge according to claim 3 wherein said abutment member is a nut screwed on to a screwthreaded end portion of said rod.

5. Spring-loaded hinge according to claim 3 wherein said enlarged end of said connecting part is substantially spherical and the inside end surface of said recess on which it bears has a complementary substantially spherical shape.

6. Spring-loaded hinge according to claim 2 wherein said orifice of said recess in which said enlarged end of said connecting part is engaged is extended laterally by a slot.

7. Spring-loaded hinge according to claim 2 wherein said articulation surfaces of said two members are extended laterally by abutment surfaces cooperating in pairs to define a pivot stop angle of one member relative to the other.

8. Spring-loaded hinge according to claim 2 wherein said articulation surfaces are shaped to include at least one shoulder extending transversely to the common axis of their contacting cylindrical parts to avoid said two members sliding relative to each other along said axis.

9. Spring-loaded hinge according to claim 8 wherein said articulation surfaces are shaped to feature two said shoulders on respective sides of said connecting part.

10. Spring loaded hinge suitable for eyeglass frames comprising: two members with respective recesses and provided at respective ends with external articulation surfaces in contact with each other, the two recesses opening at facing orifices, a connecting part accommodated in the two recesses passing through said orifices and having an enlarged end abutted against an inside end surface of one of said recesses and having its other end coupled to a spring accommodated in the other recess, wherein said one of said recesses is open laterally and comprises a cavity shaped and sized to accommodate said enlarged end and extended by a slot enabling movement of said connecting part, wherein a locking member is shaped as a ring slidably mounted at the end of that hollow member having said cavity to hold said enlarged end in said recess open laterally, wherein an abutment member is mounted to slide on said connecting part and is urged towards said enlarged part by said spring which is prestressed to urge said articulation surfaces against each other, and wherein fixed means is provided between said other hollow member and said abutment member to fasten them together.

11. Spring-loaded hinge according to claim 10 wherein said articulation surfaces are respective contacting edges of said locking member and said other hollow member.

12. Spring-loaded hinge according to claim 10 wherein said abutment member is bobbin-shape with an annular groove and said fixing member is inserted through a hole in said other hollow member and projects internally into said annular groove.

13. Spring-loaded hinge according to claim 12 wherein said fixing member is a pin comprising a reduced diameter portion normally engaged in said hole in said other hollow member and the diameter of said hole is larger than that of said reduced diameter portion so that the action of said spring on said abutment member locks said fixing member.

14. Spring-loaded hinge according to claim 10 wherein said other hollow member has at its end a cavity open laterally whose edge has two parts substantially perpendicular to each other.

* * * * *